Figure 1:
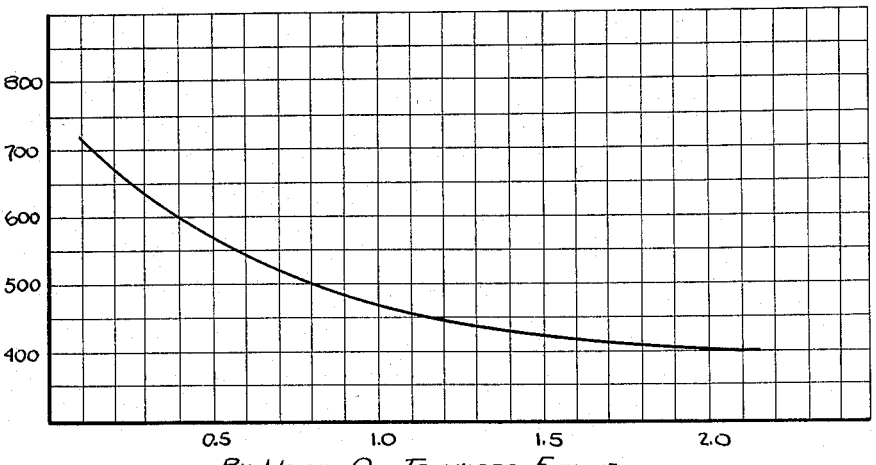

INVENTORS
HERMANN RICHTZENHAIN
PAUL RIEGGER
BY
AGENT

United States Patent Office 3,290,398
Patented Dec. 6, 1966

3,290,398
PROCESS OF CONTINUOUSLY PRODUCING
VINYLIDENE CHLORIDE
Hermann Richtzenhain, Cologne-Sulz, and Paul Riegger, Bonn, Germany, assignors to Feldmuehle Papier- und Zellstoffwerke Aktiengesellschaft, Dusseldorf-Oberkassel, Germany, a corporation of Germany
Filed Jan. 15, 1962, Ser. No. 166,049
Claims priority, application Germany, Jan. 18, 1961, F 32,990
7 Claims. (Cl. 260—654)

The present invention relates to a new and improved process of producing vinylidene chloride and, more particularly, to a continuous process of producing such vinylidene chloride.

It is known to produce vinylidene chloride by continuously introducing trichloro ethane and aqueous solutions or dispersions of alkali metal hydroxides or, respectively, alkaline earth metal hydroxides to a tower-like reaction vessel from separate storage containers. The content of the reaction vessel is heated to a temperature above the boiling point of vinylidene chloride by externally supplying heat. Unreacted trichloro ethane is separated from the reaction products by means of a reflux condenser provided at the top of the reactor, and is recycled into the process. This process has the disadvantage that high yields cannot be obtained within a reasonable period of time. The process, thus is economically not feasible for operation on a large scale.

It is one object of the present invention to provide a simple and effective continuous process of producing vinylidene chloride by reacting 1,1,2-trichloro ethane with an aqueous solution of an alkali metal hydroxide or, respectively, with an aqueous suspension of an alkaline earth metal hydroxide.

Other objects of the present invention and advantageous features thereof will become apparent as the description proceeds.

According to the present invention it has been found that substantially quantitative reaction can be achieved when emulsifying the 1,1,2-trichloro ethane with a preheated aqueous solution of an alkali metal hydroxide or, respectively, an aqueous suspension of an alkaline earth metal hydroxide prior to introducing it into the reaction vessel. Such an emulsion is obtained, for instance, by using a centrifugal pump, a vibrating mixer, or other suitable emulsifying apparatus. When using such an emulsion and introducing it into the unheated reaction vessel, the speed of reaction of the 1,1,2-trichloro ethane is such that liquid components disappear in the lower part of the reaction tower and that a dispersion consisting solely of vapor bubbles is formed. The reaction tower itself is isolated and operates adiabatically.

A preferred procedure is to control the temperature of the spent alkaline solution leaving the head of the tower by proper adjustment of the temperature of the alkaline solution or, respectively, the alkaline suspension containing trichloro ethane emulsified therein. The discharge temperature of the waste alkaline solution is preferably between 60° C. and 100° C. By suitably correlating the dimensions of the reactor and the reaction temperature, optimum conditions are provided with respect to the economy of the process.

The process according to the present invention permits to use, as starting material, crude 1,1,2-trichloro ethane having a tetrachloro ethane content of 5–6% as it is obtained on large scale production. To produce vinylidene chloride which is substantially free of trichloro ethane and contains only trichloro ethylene or traces of unreacted tetrachloro ethane as impurities requires either an increase in reaction temperature or an increase in length of the reaction vessel or a combination of both features. The resulting vinylidene chloride can readily be separated from higher boiling by-products by simple distillation.

It is not necessary to use an emulsifier in order to prepare the emulsion of the alkali metal hydroxide solution and trichloro ethane. Emulsification can be effected by simply passing the mixture through a centrifugal pump or through other emulsifying apparatus. It is also possible to use a container provided with a high-speed agitator at one side of which the reactants to be mixed are introduced while the resulting emulsified mixture is withdrawn at the other side thereof.

The speed of reaction is dependent upon the degree of dispersion of the trichloro ethane in the alkaline agent, i.e., upon the surface of the dispersed particles and upon the temperature. It is of prime importance that the feed line to the reactor is dimensioned in such a manner that turbulent flow of the emulsion is maintained therein and, furthermore, that the mixture of trichloro ethane and alkaline agent remains in the emulsifier and in said feed line for a sufficient period of time depending on the temperature. Initial reaction between trichloro ethane and the alkaline agent must have proceeded to such an extent that, on introducing the emulsion into the reactor, the liquid-vapor equilibrium between the organic/aqueous dispersion phase, on the one hand, and the azeotropic vapor phase consisting of trichloro ethane, vinylidene chloride, and water, on the other hand, is attained. As a result thereof the vapor bubbles formed in the reactor maintain the reactants in the emulsified state in the wider cross-section of the reactor due to the turbulence created thereby. Finally, with proceeding flow, the emulsion is converted into a pure column of bubbles. The cross-section of the reactor must also be dimensioned so that the turbulent flow of the column of bubbles assures satisfactory dispersion of the trichloro ethane in the alkaline agent. Larger bubbles which may be formed in spite of these precautions are broken up by installing sieves or wire nets in the reactor. In this manner the ascending bubbles move progressively upwardly, thereby producing simultaneously vortex motion. In this manner complete reaction is effected, whereby the speed of reaction is to a large extent independent from the hydroxyl ion concentration.

It is, of course, understood that the trichloro ethane content of the resulting vinylidene chloride is dependent upon the height of the reactor. The curve of FIG. 1 attached hereto demonstrates such a dependence. Said curve was plotted from test results obtained by carrying out the reaction at the same temperature of 86° C. under like conditions. This curve clearly shows that the unreacted trichloro ethane content is the lower, the higher the reaction tower is. It is, of course, understood, that these results can be varied and/or improved by varying the emulsifying conditions and the conditions of flow. To achieve complete reaction is essentially a function of the height of the reactor column and also of the reaction temperature.

Figure 2:
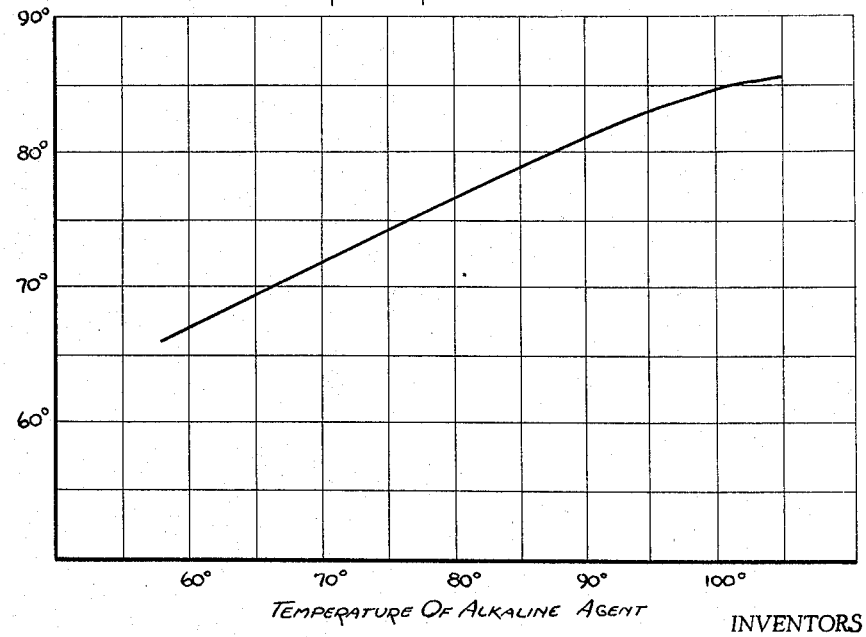

The heat balance of the process according to the present invention is controlled by the following heat transfer equation:

Heat content of the material introduced into the reactor+heat of reaction=heat content of the discharged material The energy to be expended in carrying out the process is supplied by heating the reactants to be introduced into the reactor. Curve 2 of attached FIG. 2 demonstrates the dependence of the head temperature of the reactor, i.e. of the temperature of the reacted materials leaving the reactor, on the temperature at which the alkaline emulsion is introduced into the reactor. In all these experiments trichloro ethane was added to the alkaline solution at room temperature. It has been found that due to the dependence of the speed of reaction on the temperature, the reaction does not proceed at a head temperature of about 60° C. Favorable conditions with respect to heat balance and yield are obtained at a head temperature between about 68° C. and about 75° C. It is also possible to operate at a higher temperature. This has the advantage that the energy supplied for emulsifying the reaction mixture can be reduced and the time during which the reactants remain in the emulsifier and in the feed pipe can be shortened. The highest possible head temperature to be achieved by solely heating the reactants during emulsification and not in the reactor, is at about 86° C. That this temperature cannot be exceeded is due to the fact that the heat supplied for emulsifying is consumed by the heat of evaporation of the water present in the vinylidene chloride vapors leaving the reactor. If a higher head temperature than about 86° C., for instance, a temperature of about 90° C. is to be achieved, it is necessary to also supply heat to the reactor, preferably by providing the reactor with a heating coil. Such higher head temperature may be required, for instance, when smaller amounts of reactants are passed through the reactor than correspond to the reactor capacity.

The following examples serve to illustrate the present invention without, however, limiting the same thereto.

*Example 1*

4.6 kg./hour of crude 1,1,2-trichloro ethane containing about 94% of 1,1,2-trichloro ethane and 6% of tetrachloro ethane of room temperature, and 12 kg./hour of 12% sodium hydroxide solution preheated to 60° C. are continuously introduced into a mixing device consisting of a centrifugal pump in which the rotor is replaced by a rotating perforated plate. The resulting emulsion is supplied to a vertical reactor consisting of a heat-insulated iron pipe of a length of 5 m. and a diameter of 80 mm. which is provided with four perforated intermediate bottoms. The spent sodium hydroxide solution containing about 0.1% to 0.5% of sodium hydroxide and the reaction product in the form of vapors are continuously withdrawn at the top of the reactor by means of a syphon. The vapors of the reaction product are condensed in a condenser. The resulting reaction product consists of 92.6% of vinylidene chloride, 1% of trichloro ethane, 1% of asymmetric tetrachloro ethane, and 5.3% of trichloro ethylene, and contains traces of 1,2-dichloro ethylene.

*Example 2*

4.6 kg./hour of crude 1,1,2-trichloro ethane of the same composition as in Example 1 and being at room temperature, and 12 kg./hour of 12% sodium hydroxide solution preheated to 75° C. are continuously introduced into a mixer as used in Example 1. The resulting emulsion is introduced into a reactor which consists of a heat-insulated vertical iron pipe of a height of 7 m. and a diameter of 80 mm. which is provided with five perforated intermediate bottoms. The spent sodium hydroxide solution which contains about 0.5% of sodium hydroxide as well as the vapors of the reaction product are withdrawn at the top of said reactor by means of a syphon. The vapors of the reaction product are condensed in a condenser and are separated by means of a water separator from the water which also has passed over. The organic liquid phase consists of 93.6% of vinylidene chloride, 0.1% of trichloro ethane, 0.8% of tetrachloro ethane, and 5.5% of trichloro ethylene.

*Example 3*

4.4 kg./hour of crude trichloro ethane at 20° C. and 11.5 kg./hour of 12% sodium hydroxide solution preheated to 70° C., are continuously introduced into an emulsifier consisting of a piston with vibrating mixer as e.g. supplied by firm Bopp & Reuther in Mannheim, Germany. The resulting emulsion is introduced into a reactor as described in Example 1. The procedure is also the same as in Example 1.

The composition of the crude trichloro ethane used in this example is as follows:

0.15% of dichloro bromo ethane,
93.83% of 1,1,2-trichloro ethane,
2.85% of asymmetric tetrachloro ethane,
3.09% of symmetric tetrachloro ethane, and
0.08% of pentachloro ethane.

The composition of the resulting crude vinylidene chloride as it leaves the reactor is as follows:

92.04% of vinylidene chloride,
0.01% of monochloro acetylene,
0.01% of dichloro acetylene,
0.41% of 1,2-trans-dichloro ethylene,
0.10% of 1,1-dichloro, ethane,
0.21% of 1,2-cis-dichloro ethylene,
6.24% of trichloro ethylene,
0.09% of tetrachloro ethylene,
0.23% trichloro ethane,
0.66% of asymmetric tetrachloro ethane.

*Example 4*

4.0 kg./hour of crude trichloro ethane preheated to 35° C. and 10.3 kg./hour of 12% sodium hydroxide solution preheated to 60° C. are continuously introduced into a mixing device as described in the Example 1. The resulting emulsion is supplied to a reactor which consists of a vertical heat-insulated iron pipe of a length of 7 m. and a diameter of 80 mm. which is provided with five perforated intermediate bottoms. At the bottom part of the reactor there is installed a heating coil for heating the emulsion introduced into the reactor. Heating is adjusted in such a manner that the head temperature is 90° C. Otherwise the procedure is the same as described in the Example 1.

The composition of the crude trichloro ethane used as starting material is as follows:

0.03% of trichloro ethylene,
0.01% of vinylidene chloride,
0.01% of 1,2-trans-dichloro ethylene,
93.7% of trichloro ethane,
3.12% of asymmetric tetrachloro ethane,
0.10% of dichloro bromo ethane,
2.87% of symmetric tetrachloro ethane,
0.16% of pentachloro ethane.

The resulting vinylidene chloride leaving the reactor has the following composition:

92.73% of vinylidene chloride,
0.15% of monochloro acetylene,
0.01% of dichloro acetylene,
0.31% of 1,2-trans-dichloro ethylene,
0.06% of 1,1-dichloro ethane,
0.18% of 1,2-cis-dichloro ethylene,
6.42% of trichloro ethylene,
0.14% of tetrachloro ethylene.

It is, of course, understood that, in place of a 12% sodium hydroxide solution, there may be employed sodium hydroxide solutions of different concentrations, whereby preferably a concentration of 26% is not exceeded. It is also possible, although economically not as feasible, to employ potassium hydroxide solution of similar concentrations. Aqueous suspensions containing between about 5% and about 20% of calcium hydroxide have also proved suitable for carrying out the present invention.

Of course, many changes and variations in the composition of the starting 1,1,2-trichloro ethane, of the alkaline solution, of the emulsifier used, of the tempera-

We claim:
1. In the process of continuously producing vinylidene chloride by reaction of a mixture of 1,1,2-trichloro ethane and an aqueous solution of sodium hydroxide in a vertical reaction zone, the improvements which consist in
    (a) using as a starting material an emulsified and partially pre-reacted mixture of 1,1,2-trichloroethane in an aqueous solution of sodium hydroxide, prepared at a temperature of at least 50° C., as starting material,
    (b) introducing said emulsified and partially pre-reacted mixture into the lower part of said reaction zone and passing it in upward flow therethrough, said reaction zone being of sufficient length to effect substantially complete conversion of trichloro ethane into vinylidene chloride,
    (c) maintaing the heat of the reaction zone at a temperature in the range of about 68° C. to about 90° C., and
    (d) withdrawing the vapors of vinylidene chloride in essentially quantitative yields with the spent sodium hydroxide from the upper part of said reaction zone.

2. The process of producing vinylidene chloride which comprises
    emulsifying 1,1,2-trichloroethane in an aqueous solution of sodium hydroxide, said sodium hydroxide being preheated to a temperature of at least about 50° C.,
    introducing the emulsion thus formed into the lower portion of a vertical reaction zone, said zone being operated adiabatically at a temperature in the range of about 68 to about 90° C.,
    passing said emulsion in turbulent flow through said zone, whereby bubbles of trichloroethane vinylidene chloride, and water are formed and move upward, and
    withdrawing the vapors of vinylidene chloride with spent aqueous solution from the upper part of said zone.

3. The process of producing vinylidene chloride which comprises
    emulsifying and partially prereacting 1,1,2-trichloroethane in an aqueous solution of sodium hydroxide, said sodium hydroxide being preheated to a temperature of at least about 50° C.,
    introducing the emulsion thus formed into the lower portion of a vertical reaction zone, said zone being operated adiabatically at a temperature in the range of about 68 to about 90° C.,
    passing said emulsion in turbulent flow through said zone, whereby bubbles of trichloroethane, vinylidene chloride, and water are formed and move upward, and
    withdrawing the vapors of vinylidene chloride with spent aqueous solution from the upper part of said zone.

4. The process of claim 3 in which the vertical reaction zone is maintained by heating at a temperature in the range of about 68 to about 90° C.

5. The process of claim 3 in which there is reacted a mixture of crude 1,1,2-trichloroethane having in admixture therewith about 5 to 6% tetrachloroethane.

6. The process of claim 3 in which there are withdrawn from the head of the reaction column vapors of vinylidene chloride in a yield of about 92% with spent sodium hydroxide.

7. The process of claim 3 in which the temperature is maintained in the range of about 68 to about 75° C.

References Cited by the Examiner

UNITED STATES PATENTS

| | | | |
|---|---|---|---|
| 1,752,049 | 3/1930 | Young | 260—654 |
| 3,065,280 | 11/1962 | Vogt | 260—654 |

FOREIGN PATENTS

| | | |
|---|---|---|
| 1,232,592 | 10/1960 | France. |
| 534,733 | 3/1941 | Great Britain. |
| 622,642 | 5/1941 | Great Britain. |

LEON ZITVER, *Primary Examiner.*

ALPHONSO D. SULLIVAN, *Examiner.*

J. W. WILLIAMS, K. V. ROCKEY, *Assistant Examiners.*